United States Patent
Yamashita (10) Patent No.: US 7,251,087 B2
(45) Date of Patent: Jul. 31, 2007

(54) LENS DRIVING APPARATUS AND IMAGE PICK-UP APPARATUS INCLUDING THE SAME

(75) Inventor: Hiroshi Yamashita, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/498,104

(22) Filed: Aug. 3, 2006

(65) Prior Publication Data
US 2007/0030580 A1    Feb. 8, 2007

(30) Foreign Application Priority Data
Aug. 8, 2005    (JP)    ............... 2005-229586

(51) Int. Cl.
*G02B 7/02*    (2006.01)
*G02B 27/64*    (2006.01)
*G11B 7/00*    (2006.01)
*G03B 3/11*    (2006.01)

(52) U.S. Cl. ............ 359/822; 359/813; 359/814; 359/824; 369/44.23; 369/44.28; 369/44.32; 250/201.2; 250/201.5; 396/133; 310/348; 74/473.12

(58) Field of Classification Search ........ 359/813, 359/814, 822, 823, 824; 369/32, 53.28, 44.12, 369/44.23, 44.28, 44.32; 250/201.2, 201.5, 250/234; 396/52, 55, 133, 148, 149, 377; 310/311, 348; 74/473.12
See application file for complete search history.

(56) References Cited

U.S. PATENT DOCUMENTS

| 4,855,982 | A | * | 8/1989 | Orlicki et al. | ........... 369/44.16 |
| 5,513,158 | A | * | 4/1996 | Ohsato | ............. 369/44.23 |
| 5,515,348 | A | * | 5/1996 | Ohsato | ............. 369/44.23 |
| 2006/0147190 | A1 | * | 7/2006 | Topliss et al. | ........... 396/133 |
| 2006/0192461 | A1 | * | 8/2006 | Topliss et al. | ........... 310/348 |
| 2006/0272440 | A1 | * | 12/2006 | Mori et al. | ........... 74/473.12 |

FOREIGN PATENT DOCUMENTS

JP    6-216424 A    8/1994
WO    WO 02/103451 A1    12/2002

* cited by examiner

*Primary Examiner*—Loha Ben
(74) *Attorney, Agent, or Firm*—Westerman, Hattori, Daniels & Adrian, LLP.

(57) ABSTRACT

An image entering from the left side of the figure passes through a correcting lens unit, and forms an image on an image pickup device on the right side of the figure. The correcting lens unit includes a cylindrical outer frame and a lens arranged therein, and at coupling points, coupled to one end of each of electrostrictive coils and suspended thereby. Electrostrictive coils strain in response to voltages applied from a voltage applying unit, causing displacement of electrostrictive coils. The displacement is transmitted to correcting lens unit through the coupling points, and therefore, in accordance with the displacement from electrostrictive coils, position and/or direction of correcting lens unit changes.

10 Claims, 12 Drawing Sheets

LENS DRIVING APPARATUS AND IMAGE PICK-UP APPARATUS INCLUDING THE SAME

BACKGROUND OF THE INVENTION

1. Field of the Invention

The present invention relates to a lens driving apparatus and an image pickup apparatus including the lens driving apparatus. More specifically, the present invention relates to a lens driving apparatus and an image pickup apparatus allowing free focus adjustment and camera shake correction.

2. Description of the Background Art

Conventionally, it has been known that when a DC electric field is applied to a crystalline body, a strain is generated in the crystalline body. A crystalline body in which strain generates upon application of the DC electric field is referred to as an electrostrictive element.

The electrostrictive element is classified into those producing electrostrictive effect, in which strain of one same direction is generated regardless of the direction of electric field generated in the crystalline body, and those producing piezoelectric effect in which direction of strain generation differs dependent on the direction of electric field generated in the crystalline body. Generally, the electrostrictive effect is produced in a crystalline body having a symmetrical crystal structure and the piezoelectric effect is produced in a crystalline body having an asymmetrical crystal structure.

An actuator realizing mechanical operation through the use of such an electrostrictive element has been proposed. By way of example, Japanese Patent Laying-Open No. 06-216424 discloses a deformation actuator utilizing a piezoelectric element, which is an electrostrictive element producing the piezoelectric effect, having a strip-shaped piezoelectric element spirally wound on a surface of a hollow coil spring. By such a deformation actuator, a small amount of strain (amount of displacement) of the piezoelectric element is enlarged to attain a sufficient amount of displacement to attain the function of the actuator.

The deformation actuator disclosed in Japanese Patent Laying-Open No. 06-216424 mentioned above, however, requires a complicated process step of spirally winding the strip-shaped piezoelectric element on the surface of the hollow coil spring. In this connection, International Publication No. WO2002/103451 discloses a camera in which an electrically active substance formed to have a spiral shape drives a lens. In this camera, the spiral-shaped electrically active substance functions as an actuator.

In the camera disclosed in International Publication No. WO2002/103451, positioning of a camera lens means focusing and zooming operations of the camera, and the lens moves along an optical axis only.

Therefore, inclination of a lens with respect to the optical axis caused in the process of assembly, or blurring due to hand movement (camera shake) at the time of image pickup cannot be corrected. Further, as the lens is held by one coil (actuator), shock-tolerance is unsatisfactory.

SUMMARY OF THE INVENTION

The present invention was made to solve the above-described problems and its object is to provide a lens driving apparatus allowing free driving of the lens for intended purposes and having high shock-tolerance, as well as to provide an image pickup apparatus including such a driving apparatus.

According to an aspect, the present invention provides a lens driving apparatus, including: a lens unit converging an image received from outside; a plurality of electrostrictive coils formed of an electrostrictive element that strains in accordance with an electric field generated inside; and a voltage applying unit applying a prescribed voltage to the electrostrictive coils in accordance with an external instruction; wherein each of the plurality of electrostrictive coils is coupled to the lens unit at mutually different coupling points, and applies displacement caused by the strain to the lens unit through the coupling points.

Preferably, the electrostrictive coil is formed by stacking a plurality of piezoelectric elements.

Preferably, the plurality of electrostrictive coils include an electrostrictive coil that strains to cause displacement of the lens unit in a direction of an optical axis of the unit.

Preferably, the plurality of electrostrictive coils include an electrostrictive coil that strains to cause displacement of the lens unit in a radial direction of an optical axis of the unit.

According to another aspect, the present invention provides an image pickup apparatus including a lens driving apparatus. The lens driving apparatus includes a lens unit converging an image received from outside, a plurality of electrostrictive coils formed of an electrostrictive-element that strains in accordance with an electric field generated inside, and a voltage applying unit applying a prescribed voltage to the electrostrictive coils in accordance with an external instruction. The image forming apparatus further includes: an image pickup device arranged on an optical axis of the lens unit, and converting the converged image to an electric signal; and an image processing unit forming an image data based on the electric signal output from the image pickup device. Each of the plurality of electrostrictive coils is coupled to the lens unit at mutually different coupling points, and applies displacement caused by the strain to the lens unit through the coupling points.

Preferably, the image pickup apparatus further includes a swing detecting unit detecting a spatial swing, and a control unit giving an instruction to drive the lens unit to the voltage applying unit. The control unit gives an instruction to the voltage applying unit based on a result of detection by the swing detecting unit, so that the lens unit offsets the spatial swing.

More preferably, the swing detecting unit detects a spatial swing with reference to the optical axis of the lens unit, and the control unit gives an instruction so that the lens unit offsets deviation from the optical axis caused by the spatial swing.

Preferably, the electrostrictive coil is formed by stacking a plurality of piezoelectric elements.

Preferably, the plurality of electrostrictive coils include an electrostrictive coil that strains to cause displacement of the lens unit in a direction of an optical axis of the unit.

Preferably, the plurality of electrostrictive coils include an electrostrictive coil that strains to cause displacement of the lens unit in a radial direction of an optical axis of the unit.

According to the present invention, the lens unit is coupled to a plurality of electrostrictive coils at mutually different points of coupling, and displaced by each of the electrostrictive coils. Therefore, as compared with an example in which it is connected to one electrostrictive coil, more delicate displacement is realized, and the shock on the lens unit is shared among the plurality of electrostrictive coils. Therefore, a lens driving apparatus allowing free driving of the lens for intended purposes and having high shock-tolerance, as well as an image pickup apparatus including such a driving apparatus are realized.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in detail with reference to the figures. Throughout the figures, the same reference characters denote the same or corresponding portions, and detailed description thereof will not be repeated.

Embodiment 1

Figure 1:
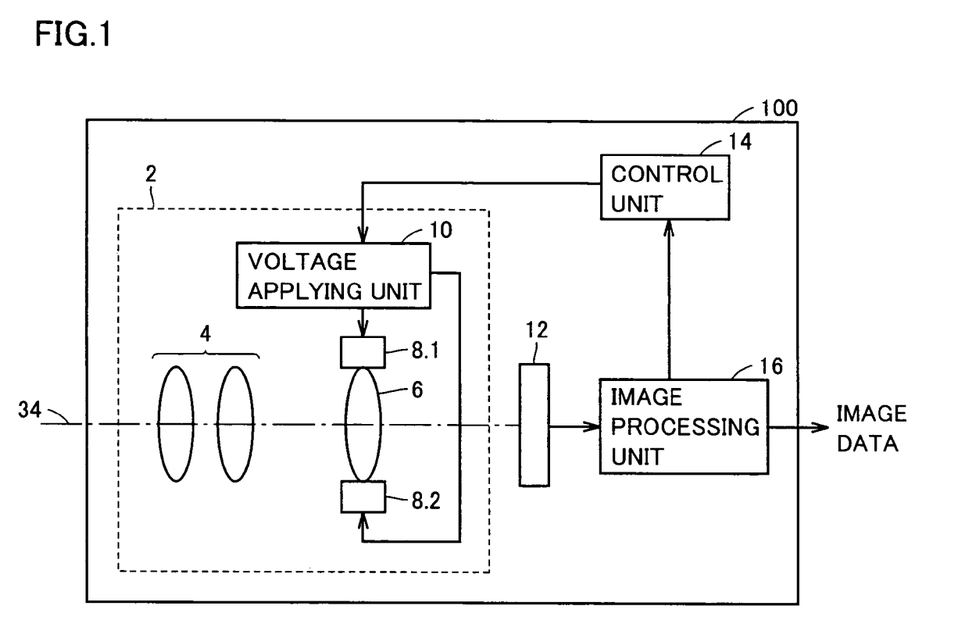
FIG. 1 schematically shows a configuration of the image pickup apparatus in accordance with Embodiment 1 of the present invention.

Referring to FIG. 1, an image pickup apparatus 100 in accordance with Embodiment 1 includes a lens driving apparatus 2, an image pickup device 12, an image processing unit 16, and a control unit 14.

In response to a driving instruction from control unit 14, lens driving apparatus 2 drives a lens, so that an image received from the outside is formed at a prescribed position of image pickup device 12. Lens driving apparatus 2 includes a lens group 4, a correcting lens unit 6, electrostrictive coils 8.1 and 8.2, and a voltage applying unit 10.

Lens group 4 includes one or more lenses arranged successively along one optical axis 34, and converges an image received from the outside with a prescribed refractive index. Lens group 4 may be a fixed focal length lens having a constant focal length, or a zoom lens of which focal length is variable.

Correcting lens unit 6 is supported by electrostrictive coils 8.1 and 8.2, and arranged along the optical axis. Correcting lens unit 6 experiences a prescribed displacement caused by electrostrictive coils 8.1 and 8.2, so that an image forming position of the image received from lens group 4 is changed.

Electrostrictive coils 8.1 and 8.2 are piezoelectric elements formed in a spiral shape, and coupled to correcting lens unit 6 at mutually different coupling points. Electrostrictive coils 8.1 and 8.2 strain in accordance with an electric field generated therein by the voltage applied from voltage applying unit 10, and the strains cause prescribe displacement of correcting lens unit 6. By way of example, electrostrictive coils 8.1 and 8.2 are formed of barium titanate or lead zirconate titanate (PZT).

Voltage applying unit 10 receives a driving instruction from control unit 14 and applies a prescribed DC voltage in accordance with the driving instruction to electrostrictive coils 8.1 and 8.2.

Image pickup device 12 receives the image formed by lens driving apparatus 2, converts the image to an electric signal and outputs the signal to image processing unit 16. Image pickup device 12 is implemented, for example, by a CCD (Charge Coupled Device) or a CMOS (Complementary Metal Oxide Semiconductor) sensor.

Image processing unit 16 generates an image data from the electric signal received from image pickup device 12. Further, image processing unit 16 evaluates the state of image formation on image pickup device 12 based on the generated image data, and determines whether the image is out of focus, or off the optical axis. Then, image processing unit 16 outputs the amount of defocus or amount of deviation from the optical axis, to control unit 14.

Based on the amount of defocus or the amount of deviation from the optical axis, control unit 14 calculates a necessary amount of correction, and applies a driving instruction based on the calculated amount of correction, to voltage applying unit 10.

(Structure of Correcting Lens Unit)

Figure 2:
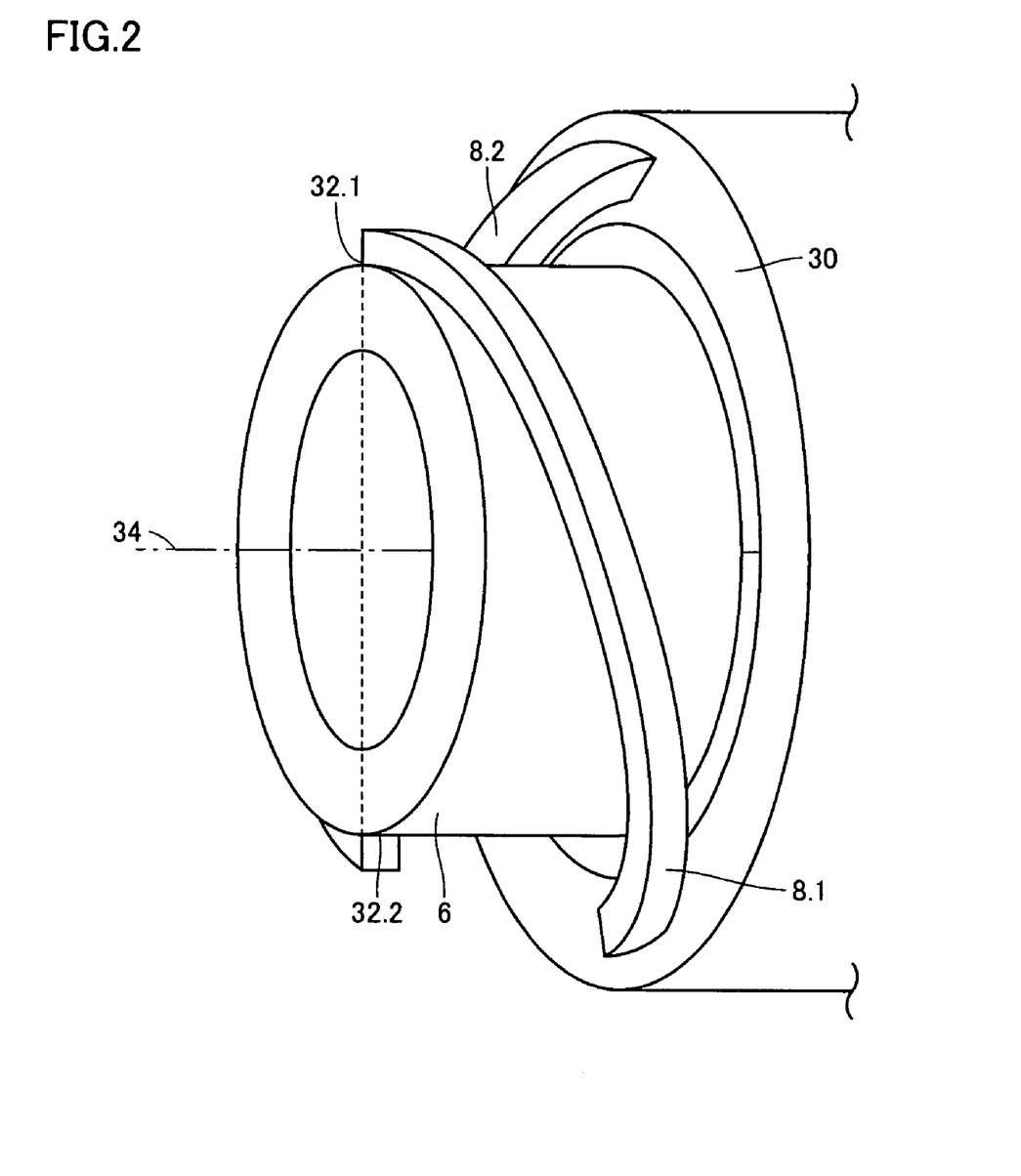
FIG. 2 schematically shows an appearance of a correcting lens unit.

Referring to FIG. 2, an image entering from the left side of the sheet passes through correcting lens unit 6, and forms an image on image pickup device 12 (FIG. 1) on the right side of the sheet.

Correcting lens unit 6 includes a cylindrical outer frame (hereinafter also referred to as a lens barrel) and a lens (not shown) arranged inside the frame, and coupled to one end of each of electrostrictive coils 8.1 and 8.2 at coupling points 32.1 and 32.2, respectively. Coupling points 32.1 and 32.2 are arranged at positions of symmetry with respect to optical axis 34. The other end of each of electrostrictive coils 8.1 and 8.2 is coupled to a fixed ring 30. Specifically, correcting lens unit 6 is suspended by electrostrictive coils 8.1 and 8.2.

Electrostrictive coils 8.1 and 8.2 strain depending on voltages applied from voltage applying unit 10. As electrostrictive coils 8.1 and 8.2 are coupled and fixed each at the other end to fixed ring 30, displacement of electrostrictive coils 8.1 and 8.2 caused by the strains is applied through coupling points 32.1 and 32.2 to correcting lens unit 6. Then, correcting lens 6 has its position and/or direction varied in accordance with the displacement from electrostrictive coils 8.1 and 8.2.

As the position and/or direction of correcting lens unit 6 changes, the image forming position of the image entering from the left side of the sheet changes. In this manner, correcting lens unit 6 can correct the incident image that is off the intended image forming position.

(Focus Adjustment)

In the following, as an example of correction of the image forming position attained by correcting lens unit 6, correction of image forming position in the direction of the optical axis will be described, which is utilized for focus adjustment or the like. In-focus position is determined by the relation of the distance between a subject and a lens relative to the distance between the lens and image pickup device 12. Therefore, focus adjustment is possible by moving correcting lens unit 6 along the optical axis.

Figure 3A:
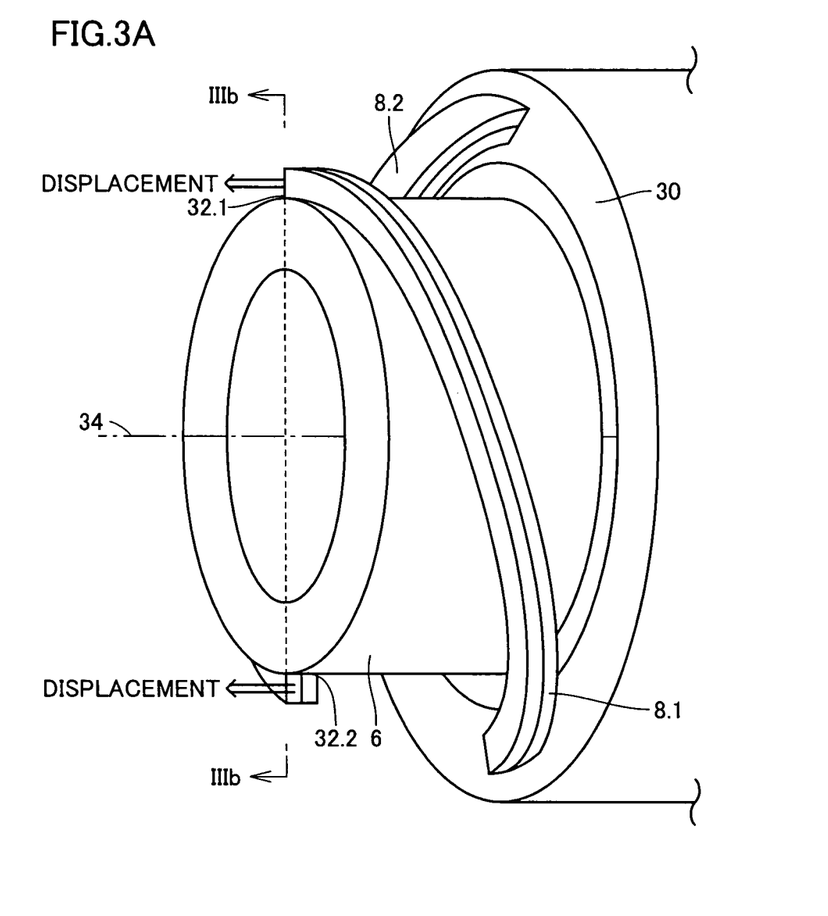
FIGS. 3A and 3B illustrate a mechanism for focus adjustment of the correcting lens unit.

FIG. 3A shows an appearance of correcting lens unit 6.

Figure 3B:
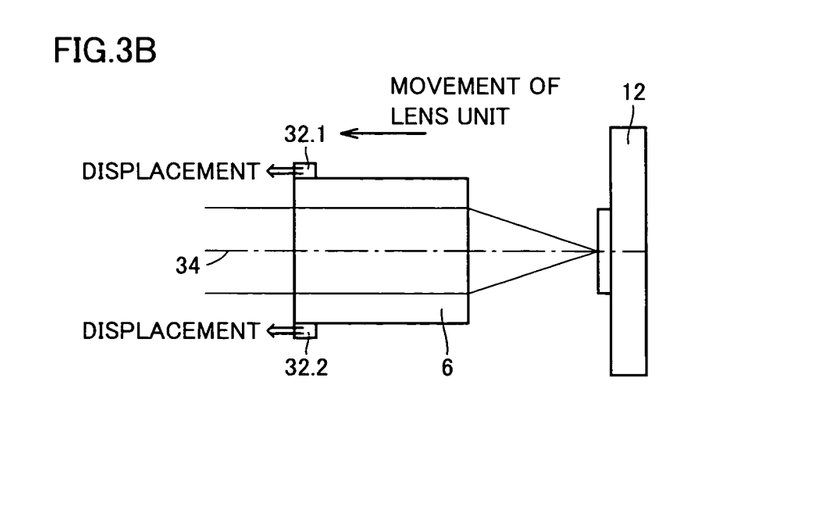

FIG. 3B is a cross sectional view taken along the line IIIb-IIIb of FIG. 3A.

Referring to FIG. 3A, electrostrictive coils 8.1 and 8.2 are each formed to be displaced in the direction of optical axis 34. Voltage applying unit 10 applies a voltage such that electrostrictive coils 8.1 and 8.2 experience the same amount of displacement. The, correcting lens unit 6 moves to the left side of the sheet, by the displacement transmitted from electrostrictive coils 8.1 and 8.2.

Referring to FIG. 3B, when correcting lens unit 6 moves to the left side of the sheet, that is, to the side where the image enters, the image forming position also moves to the entering side. Thus, focus adjustment is attained by correcting lens unit 6.

Similarly, when voltage applying unit 10 (FIG. 1) inverses the polarity of voltage to be applied, the direction of displacement in electrostrictive coils 8.1 and 8.2 is inversed, and hence, correcting lens unit 6 can be moved to the right side of the sheet.

Figure 4:
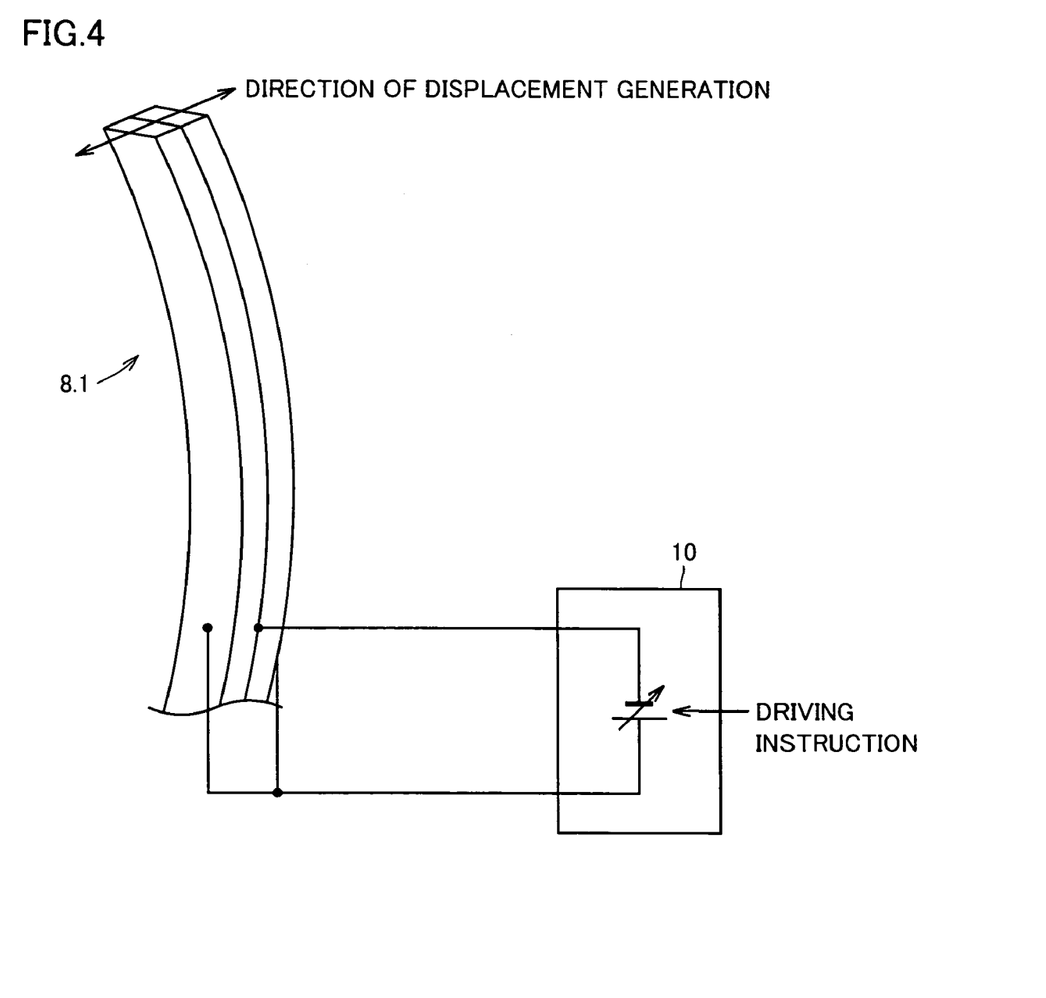
FIG. 4 illustrates a structure of an electrostrictive coil.

Referring to FIG. 4, electrostrictive coil 8.1 has a stacked structure including two members joined along the direction of the optical axis. The two members joined together are formed of the same piezoelectric material. Further, electrostrictive coil 8.1 has a curved structure of which joint surface matches the radial direction of correcting lens unit 6. Such a structure having two members joined together is also referred to as a bimorph structure.

Voltage applying unit 10 changes the voltage to be output and the polarity of the voltage, in accordance with a driving instruction received from control unit 14.

When voltage applying unit 10 applies the voltage to the joint surface between the two members and to the outer surfaces of respective members, electrostrictive coil 8.1 strains to decrease or increase the amount of curvature of itself dependent on the polarity of the applied voltage, causing displacement in a direction vertical to the joint surface. Specifically, as the joint surface matches the radial direction of the optical axis, electrostrictive coil 8.1 causes displacement of correcting lens unit 6 in the direction of the optical axis.

Electrostrictive coil 8.2 has the same structure as electrostrictive coil 8.1 and, therefore, detailed description thereof will not be repeated.

As described above, use of electrostrictive coils 8.1 and 8.2 that cause displacement of correcting lens unit 6 along the optical axis realizes focus adjustment.

Again referring to FIG. 1, control unit 14 calculates necessary amount of correction based on the amount of defocus received from image processing unit 16, and applies a driving instruction in accordance with the calculated amount of correction to voltage applying unit 10. Then, voltage applying unit 10 applies the prescribed voltage to electrostrictive coils 8.1 and 8.2, whereby focus adjustment is attained.

Electrostrictive coils 8.1 and 8.2 consume current because of internal polarization while they receive the voltage from voltage applying unit 10 and strain. After the generation of strains, however, the coils hardly consume any current. Therefore, the amount of electric energy supplied from voltage applying unit 10 to electrostrictive coils 8.1 and 8.2 is very small.

Further, in the example described above, a single correcting lens unit 6 is driven in the direction of the optical axis for adjustment. A structure in which lens group 4 is driven in the direction of the optical axis using electrostrictive coils similar to coils 8.1 and 8.2 may be adopted. In such a structure, the positional relation between lens group 4 and correcting lens unit 6 can be changed, and therefore, the focal distance of the lens as a whole is changed, realizing a zoom operation.

According to Embodiment 1 of the present invention, the lens unit is coupled to two electrostrictive coils at mutually different coupling points and receives displacement along the optical axis from respective electrostrictive coils. Therefore, compared with an example in which the lens unit is connected to one electrostrictive coil, stable displacement in the direction of the optical axis is attained, and the shock experienced by the lens unit can be shared by the plurality of electrostrictive coils. As a result, an image pickup apparatus allowing stable focus adjustment and having high shock tolerance can be realized.

Further, according to Embodiment 1 of the present invention, the electrostrictive coil consumes little current to maintain the displaced state, and therefore, an image pickup apparatus with reduced power consumption can be realized.

Embodiment 2

In Embodiment 1 described above, a structure providing displacement in the direction of the optical axis for focus adjustment has been described. In Embodiment 2, a structure for correcting camera shake caused by a spatial swing will be described.

Figure 5:
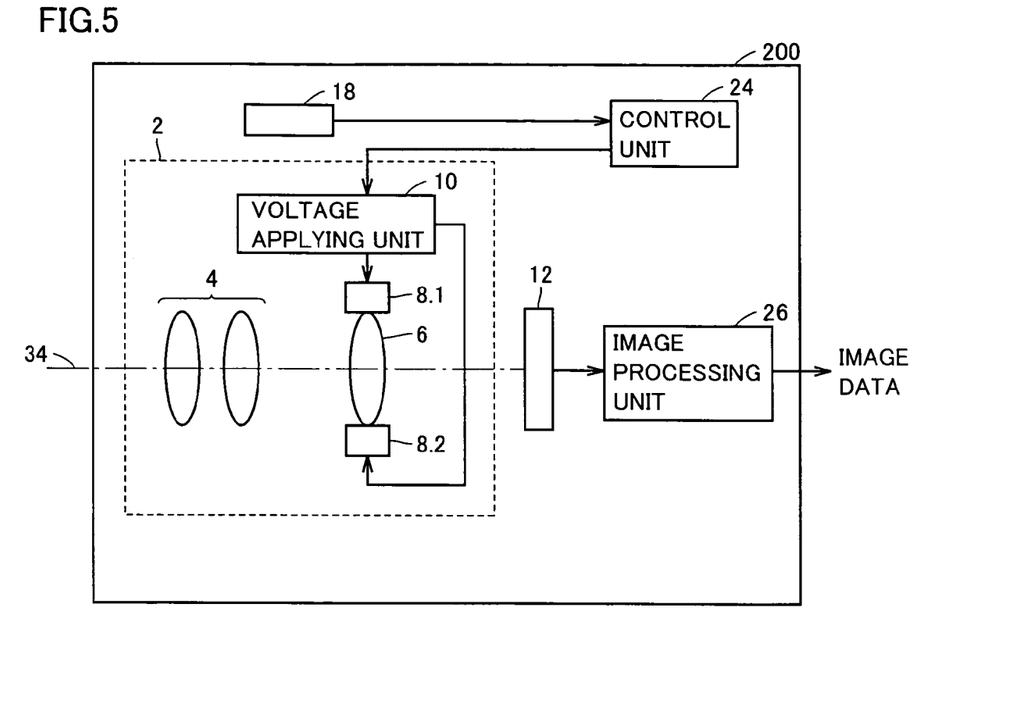
FIG. 5 schematically shows a configuration of the image pickup apparatus in accordance with Embodiment 2 of the present invention.

Referring to FIG. 5, an image pickup apparatus 200 in accordance with Embodiment 2 of the present invention includes a lens driving apparatus 2, an image pickup device 12, an image processing unit 26, a swing detecting unit 18, and a control unit 24.

Image processing unit 26 generates image data from electric signals received from image pickup device 12.

Swing detecting unit 18 detects a spatial swing of image pickup apparatus 200, and outputs a result of detection to control unit 24. Swing detecting unit 18 includes an angular velocity sensor detecting angular velocity involved in the spatial swing. Swing detecting unit 18 integrates outputs from angular velocity sensor, and outputs a displacement angle caused by the spatial swing. Angular velocity sensor is implemented by a piezoelectric element such as piezoelectric ceramics or piezo film, or a gyro-detecting angular velocity. Here, one angular velocity sensor detects angular velocity in one axial direction, and therefore, in order to detect angular velocities in a plurality of axial directions, swing detecting unit 18 is implemented by a plurality of angular velocity sensors arranged along mutually different axial directions.

Control unit 24 applies a driving instruction to voltage applying unit 10 so that the spatial swing detected by swing detecting unit 18 is offset (cancelled).

Lens driving apparatus 2 and image pickup device 12 are the same as those of image pickup apparatus 100 in accordance with Embodiment 1 and, therefore, detailed description thereof will not be repeated.

(Spatial Swing)

Main cause of a spatial swing is inclination of the image pickup apparatus as a whole when the user presses a shutter button. Therefore, the spatial swing mainly leads to pitching and yawing.

Figure 6:
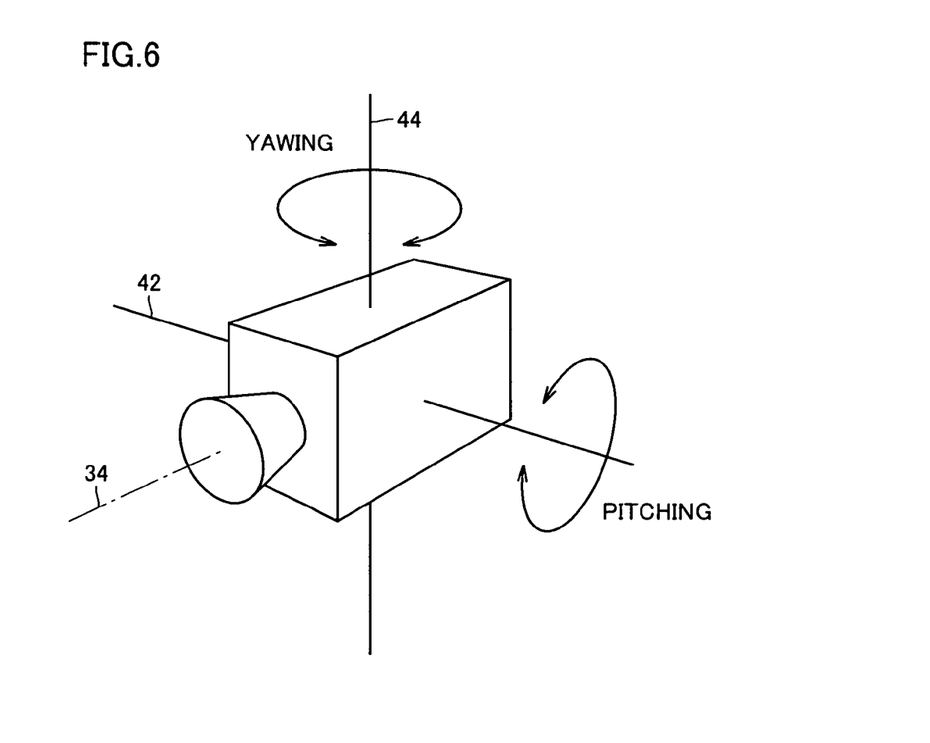
FIG. 6 is an explanatory diagram of spatial swings.

Referring to FIG. 6, pitching refers to a rotational movement about a horizontal axis 42 that is orthogonal to the optical axis 34 of image pickup apparatus 200. Yawing refers to a rotational movement about a vertical axis 44 that is orthogonal to the optical axis 34 of image pickup apparatus 200.

As described above, swing detecting unit 18 detects pitching and/or yawing, and in accordance with the result of detection, control unit 24 generates a driving instruction to offset the spatial swing.

(Camera Shake Correction)

Figure 7A:
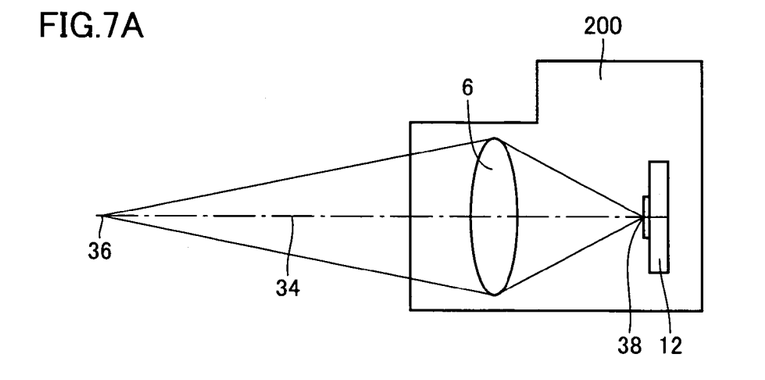
FIGS. 7A to 7C illustrate principle of camera shake correction.

FIG. 7A shows a state in which an image is successfully formed on image pickup device 12.

Figure 7B:
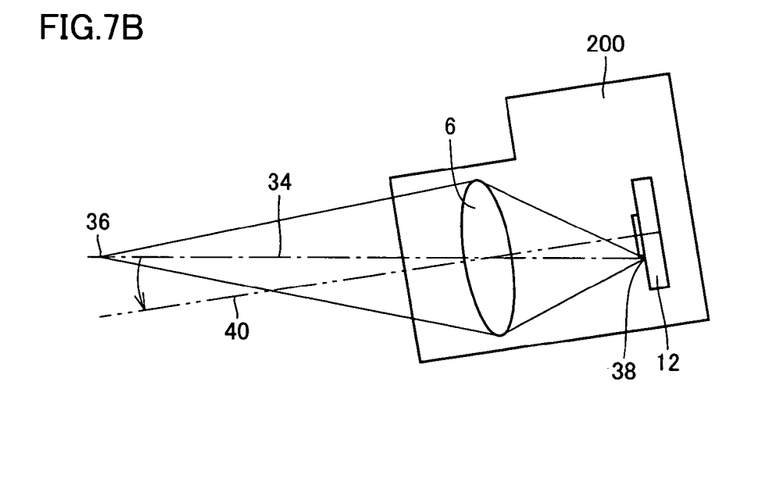

FIG. 7B shows a state in which the image forming position is deviated because of pitching.

Figure 7C:
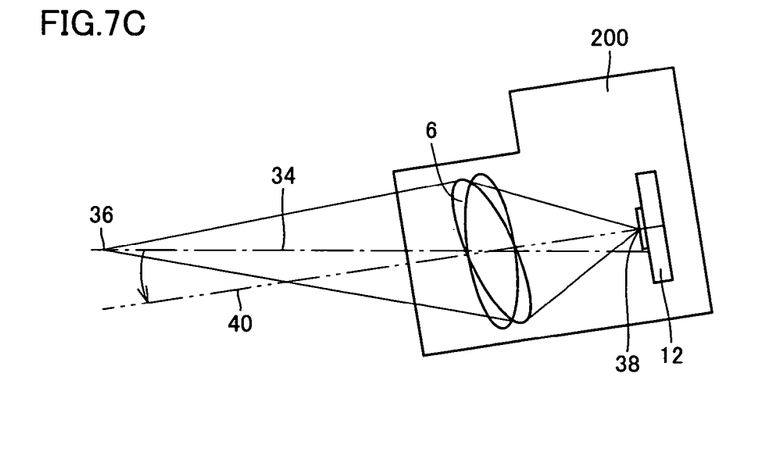

FIG. 7C shows a state in which successful image forming is realized by correcting lens unit 6.

Referring to FIG. 7A, a subject 36 is on a line extended from optical axis 34 of image pickup apparatus 200, and the image is formed on an image forming point 38 on image pickup device 12.

Referring to FIG. 7B, when image pickup apparatus 200 inclines downward of the sheet because of pitching, the optical axis of image pickup apparatus 200 changes from optical axis 36 to optical axis 40. Therefore, an image is formed on the image pickup device 12 on a line extended from optical axis 40, and the image forming point 38 of subject 36 on the line extended from optical axis 34 before the change moves downward of the sheet from image pickup device 12. Therefore, image pickup device 12 cannot provide any electric signal representing the image of subject 36.

Therefore, referring to FIG. 7C, correcting lens unit 6 is inclined such that the image of subject 36 entering along optical axis 34 is refracted and directed along optical axis 40, whereby image pickup device 12 outputs an electric signal representing the image of subject 36.

Figure 8A:
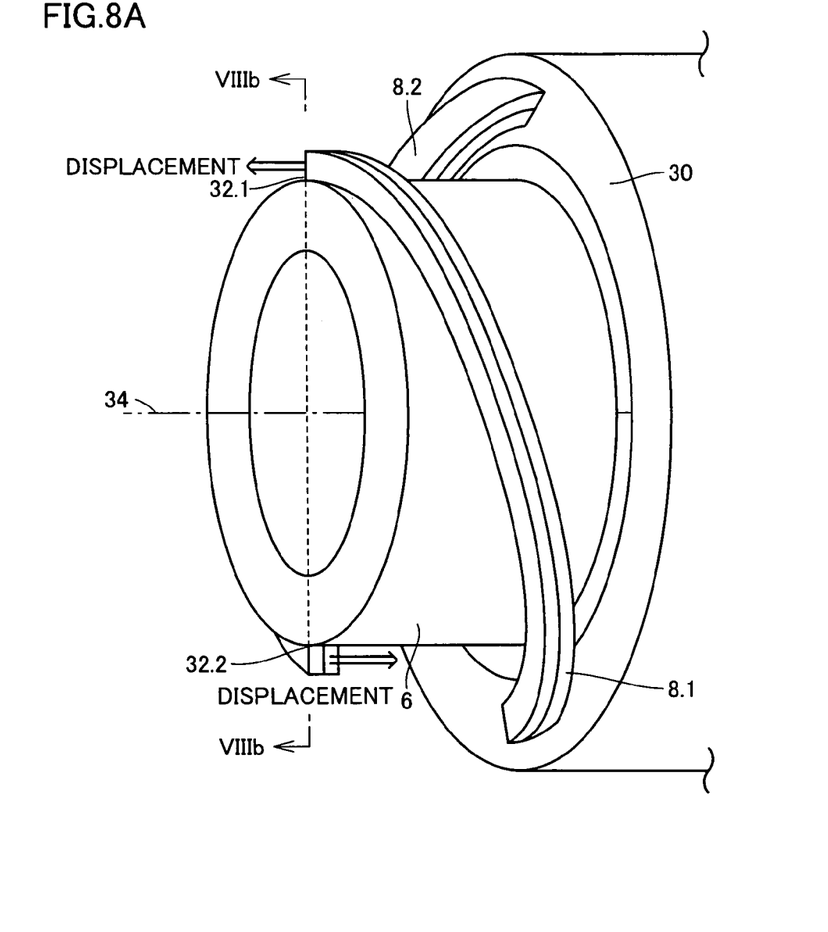
FIGS. 8A and 8B illustrate a mechanism for camera shake correction of the correcting lens unit.

FIG. 8A shows an appearance of correcting lens unit 6.

Figure 8B:
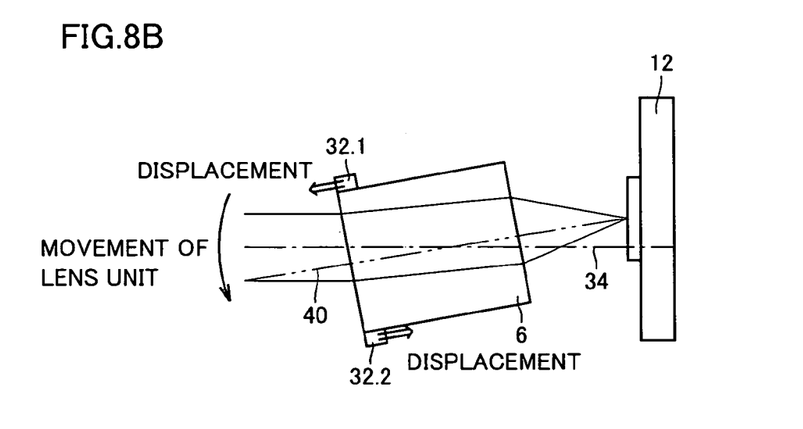

FIG. 8B is a cross sectional view taken along the line VIIIb-VIIIb of FIG. 8A.

Referring to FIG. 8A, correcting lens unit 6 is coupled to electrostrictive coils 8.1 and 8.2 that generate displacement along the axial direction of optical axis 34, in the similar manner as correcting lens unit 6 shown in FIG. 3A. Voltage applying unit 10 (FIG. 5) applies voltages of opposite polarities to each other, electrostrictive coils 8.1 and 8.2. Then, electrostrictive coil 8.1 causes displacement of correcting lens unit 6 to the left side of the sheet, and electrostrictive coil 8.2 causes displacement of correcting lens unit 6 to the right side of the sheet. Thus, correcting lens unit 6 inclines to the lower left side of the sheet, with respect to optical axis 34.

Referring to FIG. 8B, when correcting lens unit 6 inclines down to the left, the image that is propagated along optical axis 34 and incident on the correcting lens unit 6 has its direction of propagation changed to the direction of optical axis 40 and output. Thus, even when there is a spatial swing of pitching, correcting lens unit 6 enables formation of the incident image on image pickup device 12.

Similarly, when the voltages applied by voltage applying unit 10 invert each of their polarities, the directions of displacement generated in electrostrictive coils 8.1 and 8.2 are reversed, and therefore, it is also possible to incline correcting lens unit 6 down to the right of the sheet.

As described above, by driving electrostrictive coils 8.1 and 8.2 causing displacement of correcting lens unit 6 along the optical axis independent from each other, it becomes possible to correct camera shake.

In Embodiment 2 described above, correction of camera shake caused by pitching has been described. It is apparent that camera shake caused by yawing can also be corrected in a similar manner. Specifically, when camera shake caused by yawing is to be corrected, correcting lens unit 6 and electrostrictive coils 8.1 and 8.2 are coupled such that coupling points 32.1 and 32.2 are arranged on a horizontal plane in the radial direction of correcting lens unit, as shown in FIG. 8A.

According to Embodiment 2 of the present invention, the lens unit receives displacement in mutually opposite directions from two electrostrictive coils. Therefore, the correcting lens unit can be inclined from the optical axis, and the direction of propagation of the incident image changes in accordance with the inclination of the axis. As a result, an image pickup apparatus can be provided in which the subject image can reliably be formed even when the image pickup apparatus swings spatially.

Embodiment 3

In Embodiment 2 above, a mechanism of correcting camera shake by inclining the correcting lens unit from the optical axis has been described. In Embodiment 3, a mechanism of correcting camera shake by moving the correcting lens unit along the radial direction of the optical axis will be described.

The image pickup apparatus in accordance with Embodiment 3 corresponds to image pickup apparatus 200 in accordance with Embodiment 2 shown in FIG. 5, with electrostrictive coils 8.1 and 8.2 replaced by electrostrictive coils 9.1 and 9.2. Except for this point, the apparatus is the same as image pickup apparatus 200 and, therefore, detailed description thereof will not be repeated.

As described above, camera shake due to a spatial swing is caused by the fact that the image forming position of the subject is deviated from the optical axis. Therefore, camera shake can also be corrected by moving the image forming position of the subject along the radial direction of the optical axis to offset the spatial swing.

Figure 9A:
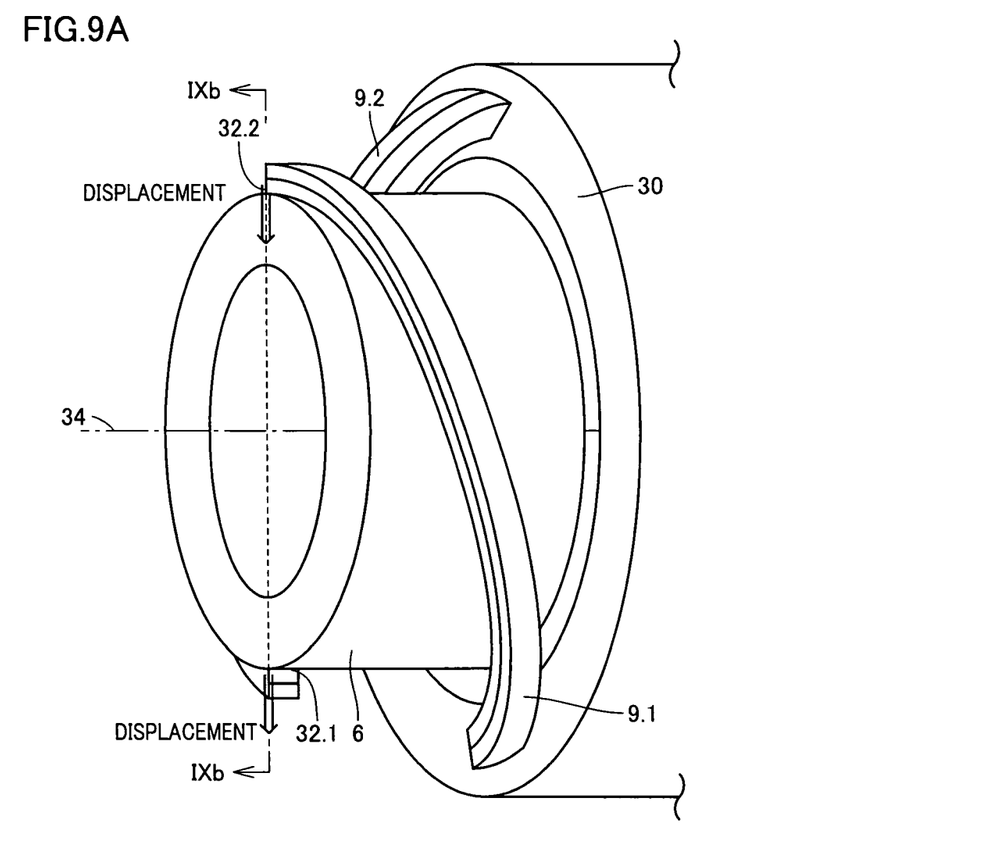
FIGS. 9A and 9B illustrate a mechanism for correcting deviation from optical axis of the correcting lens unit in accordance with Embodiment 3.

FIG. 9A shows an appearance of correcting lens unit 6.

Figure 9B:
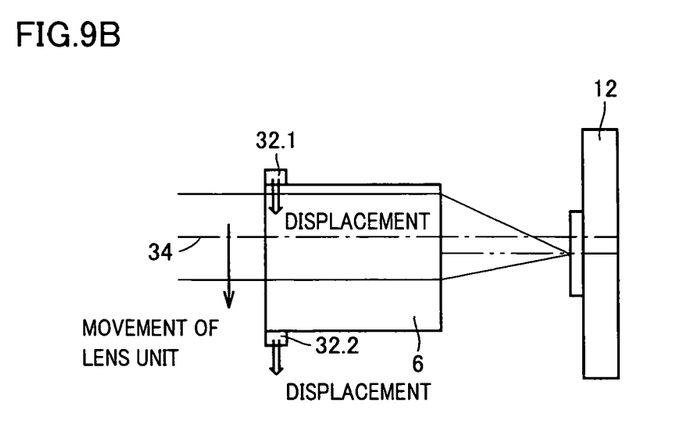

FIG. 9B is a cross sectional view taken along the line IXb-IXb of FIG. 9A.

Referring to FIG. 9A, electrostrictive coils 9.1 and 9.2 are each formed to generate displacement in the radial direction of the optical axis 34. Voltage applying unit 10 (FIG. 5) applies voltages of opposite polarities to each other, electrostrictive coils 9.1 and 9.2 so that displacement in mutually opposite directions results in the coils. Then, correcting lens unit 6 moves downward of the sheet, because of the displacement caused by electrostrictive coils 9.1 and 9.2.

Referring to FIG. 9B, when correcting lens unit 6 moves downward as shown in the figure, the image forming position also moves downward. Therefore, it is possible for correcting lens unit 6 to form the incident image, which has passed through lens group 4, at the center of image pickup device 12, even when the image forming position of the subject is off the central point of image pickup device 12.

Similarly, when the voltages applied by voltage applying unit 10 (FIG. 5) invert each of their polarities, the directions of displacement generated in electrostrictive coils 9.1 and 9.2 are reversed, and therefore, it is also possible to move correcting lens unit 6 upward of the sheet.

Figure 10:
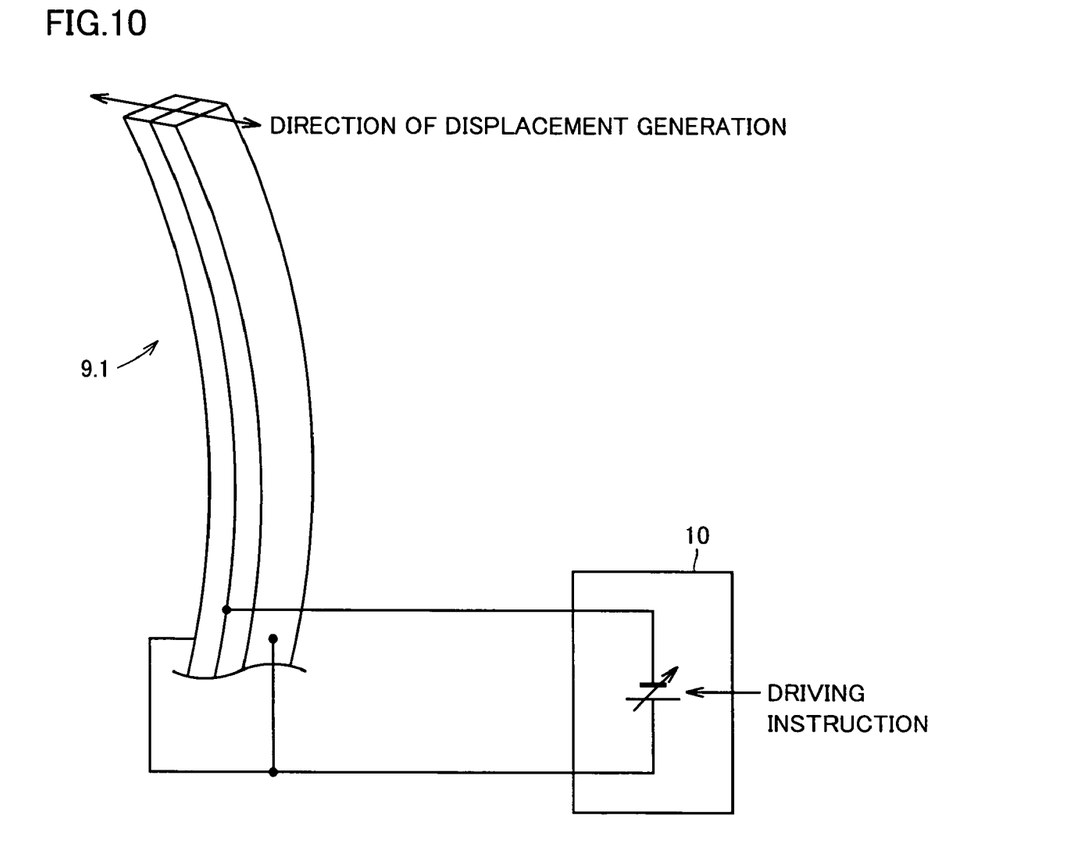
FIG. 10 illustrates a structure of the electrostrictive coil.

Referring to FIG. 10, electrostrictive coil 9.1 has a stacked structure including two members joined along the radial direction of the optical axis. The two members joined together are formed of the same piezoelectric material.

Further, electrostrictive coil 9.1 has a curved structure of which joint surface matches the circumferential direction of correcting lens unit 6.

When voltage applying unit 10 applies the voltage to the joint surface between the two members and to the outer surfaces of respective members, electrostrictive coil 9.1 strains to decrease or increase the amount of curvature of itself dependent on the polarity of the applied voltage, causing displacement in a direction vertical to the joint surface. Specifically, as the joint surface matches the circumferential direction of the optical axis, electrostrictive coil 9.1 causes displacement of correcting lens unit 6 in the radial direction of the optical axis.

Electrostrictive coil 9.2 is the same as electrostrictive coil 9.1 and, therefore, detailed description thereof will not be repeated.

As described above, using electrostrictive coils 9.1 and 9.2 causing displacement of correcting lens unit 6 in the radial direction of the optical axis, deviation of optical axis can be corrected.

According to Embodiment 3 of the present invention, the lens unit is coupled to two electrostrictive coils at mutually different coupling points, and receives displacement in the radial direction of the optical axis from respective electrostrictive coils. Therefore, compared with an example in which the lens unit is connected to one electrostrictive coil, stable displacement in the radial direction of the optical axis is attained, and the shock experienced by the lens unit can be shared by the plurality of electrostrictive coils. As a result, an image pickup apparatus allowing stable camera shake correction and having high shock tolerance can be realized.

Embodiment 4

In Embodiments 1 to 3 above, electrostrictive coils that provide displacement only in the direction of the optical axis or in the radial direction of the optical axis have been described. In Embodiment 4, a structure adopting an electrostrictive coil that provides displacement both in the direction of the optical axis and in the radial direction of the optical axis will be described.

Figure 11:
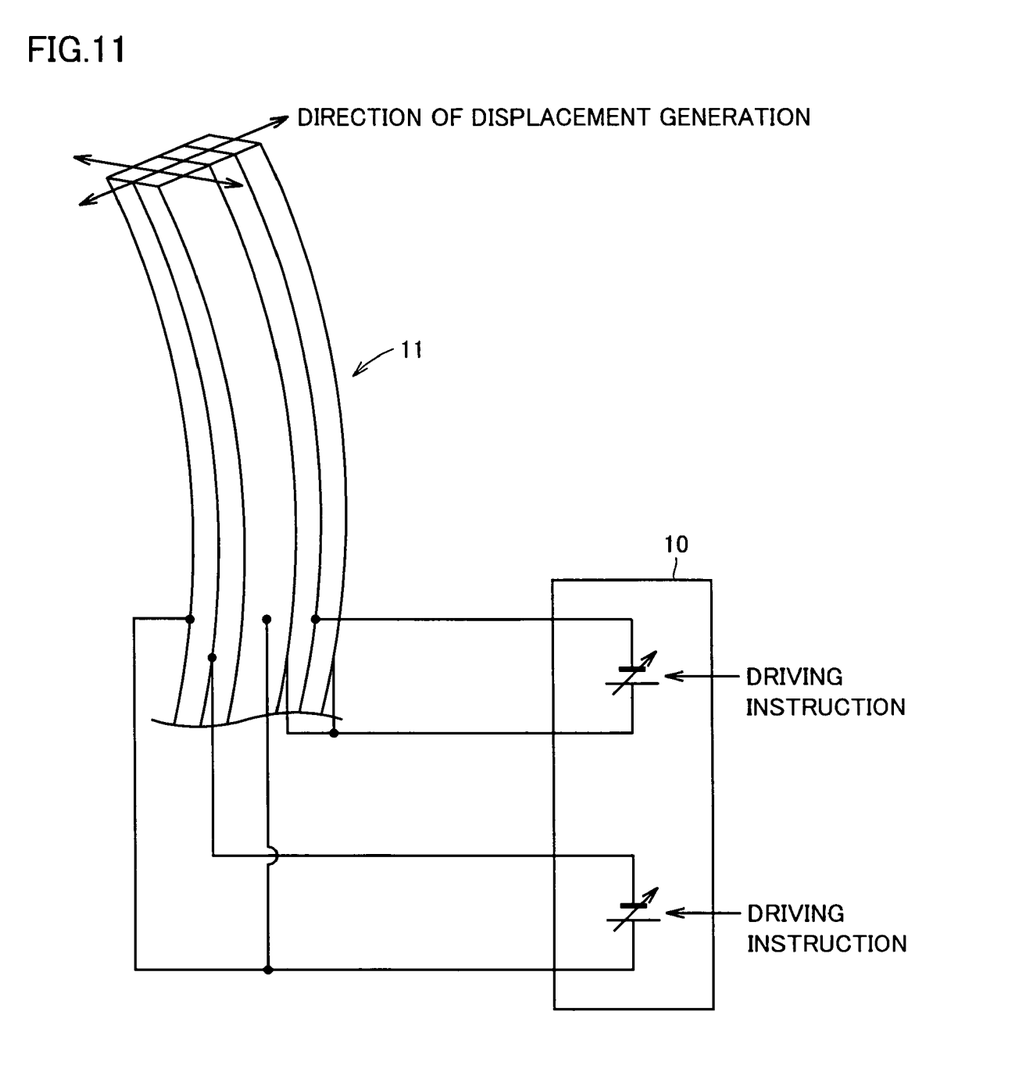
FIG. 11 illustrates a structure of the electrostrictive coil in accordance with Embodiment 4.

Referring to FIG. 11, an electrostrictive coil 11 in accordance with Embodiment 4 has a stacked structure including four members, in which two members are joined along the direction of the optical axis and two members are joined along the radial direction of the optical axis. The four members joined together are formed of the same piezoelectric material.

Specifically, electrostrictive coil 11 in accordance with Embodiment 3 is equivalent to a combination of electrostrictive coil 8.1 shown in FIG. 4 and electrostrictive coil 9.1 shown in FIG. 10 joined together. Therefore, the coil encompasses characteristics of both electrostrictive coils 8.1 and 9.1, and it is capable of applying displacement in the direction of the optical axis and displacement in the radial direction of the optical axis independent from each other, to correcting lens unit 6 in accordance with the voltage applied from voltage applying unit 10.

When voltage applying unit 10 applies the voltage to the joint surface between the two members joined along the direction of the optical axis and to the outer surfaces of respective members, displacement in the direction of the optical axis is caused in the correcting lens unit 6, as in the case of electrostrictive lens 8.1. Further, when voltage applying unit 10 applies the voltage to the joint surface between the two members joined along the radial direction of the optical axis and to the outer surfaces of respective members, displacement in the radial direction of the optical axis is caused in the correcting lens unit 6, as in the case of electrostrictive lens 9.1.

As described above, as electrostrictive coil 11 that causes displacement in the direction of the optical axis and displacement in the radial direction of the optical axis independent from each other is used, correcting lens unit 6 can be driven freely, realizing more effective correction.

According to Embodiment 4, the effects of Embodiments 1 to 3 can be attained and, in addition, it becomes possible to form the lens driving apparatus with smaller number of electrostrictive coils. Therefore, the lens driving apparatus can be made compact, and an image pickup apparatus enabling more delicate correction by providing displacement to correcting lens unit in the direction of the optical axis and in the radial direction of the optical axis can be realized.

Embodiment 5

In Embodiments 2 and 3, mechanisms each for correcting camera shake caused by pitching or yawing have been described. In Embodiment 5, a mechanism that enables correction of camera shake no matter whether it is caused by pitching or yawing will be described.

Figure 12:
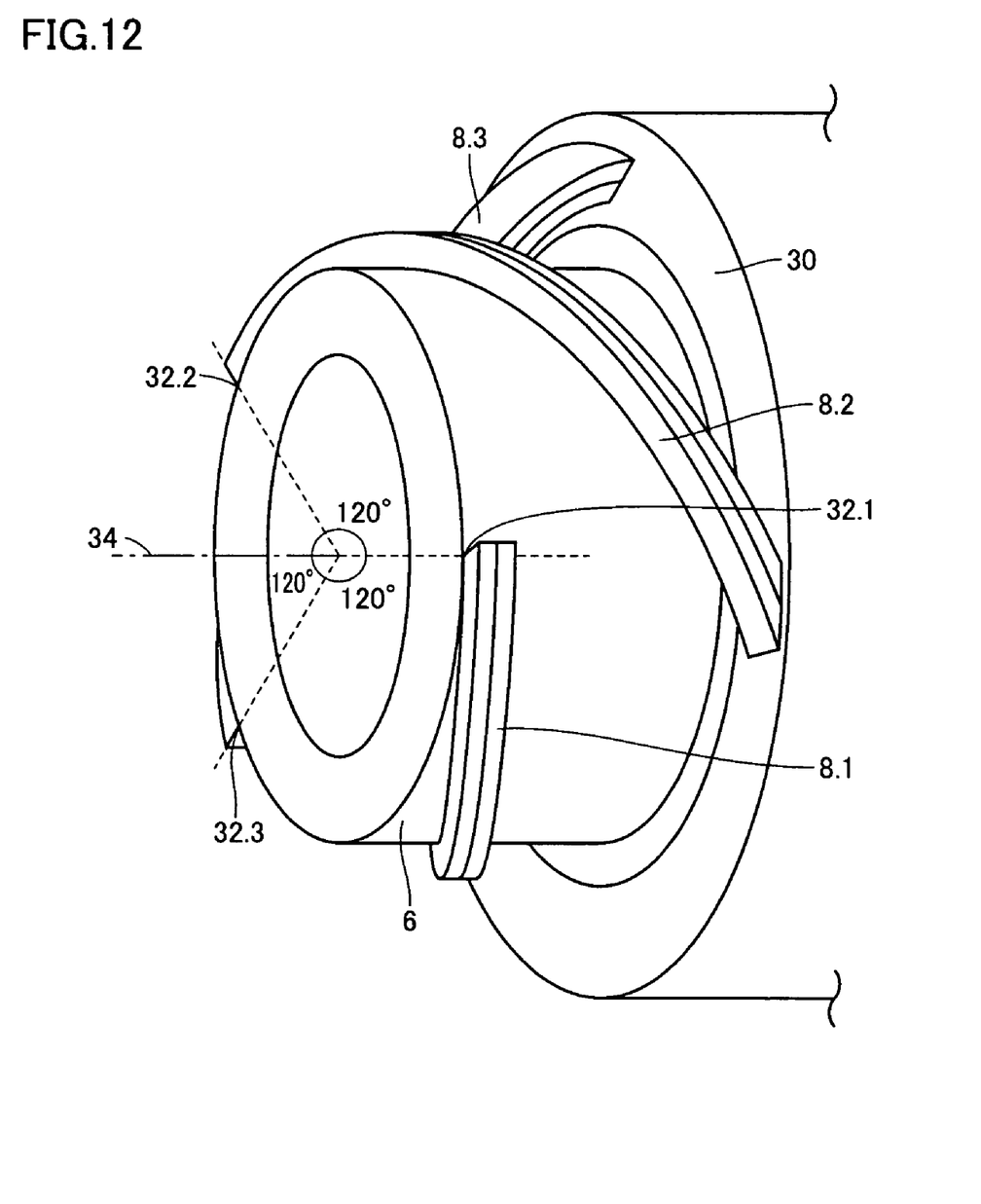
FIG. 12 schematically shows an appearance of the correcting lens unit coupled to three electrostrictive coils in accordance with Embodiment 5.

Referring to FIG. 12, correcting lens unit 6 is coupled to one end of each of electrostrictive coils 8.1, 8.2 and 8.3 at coupling points 32.1, 32.2 and 32.3, respectively: Coupling points 32.1, 32.2 and 32.3 are arranged at an equal distance (at the interval of 120°), with the optical axis 34 being at the center. Further, electrostrictive coils 8.1, 8.2 and 8.3 are coupled at the other end to fixed ring 30.

Each of electrostrictive coils 8.1, 8.2 and 8.3 is formed to apply displacement in the direction of optical axis 34 to correcting lens unit 6. Further, each of the electrostrictive coils 8.1, 8.2 and 8.3 receives a voltage from voltage applying unit 10 independent from each other, and those are capable of causing displacement of correcting lens unit 6 in any of the directions to the left, to the right, to the front side and to the depth side of the sheet.

Therefore, camera shake caused either by pitching or yawing can be corrected.

Figure 13:
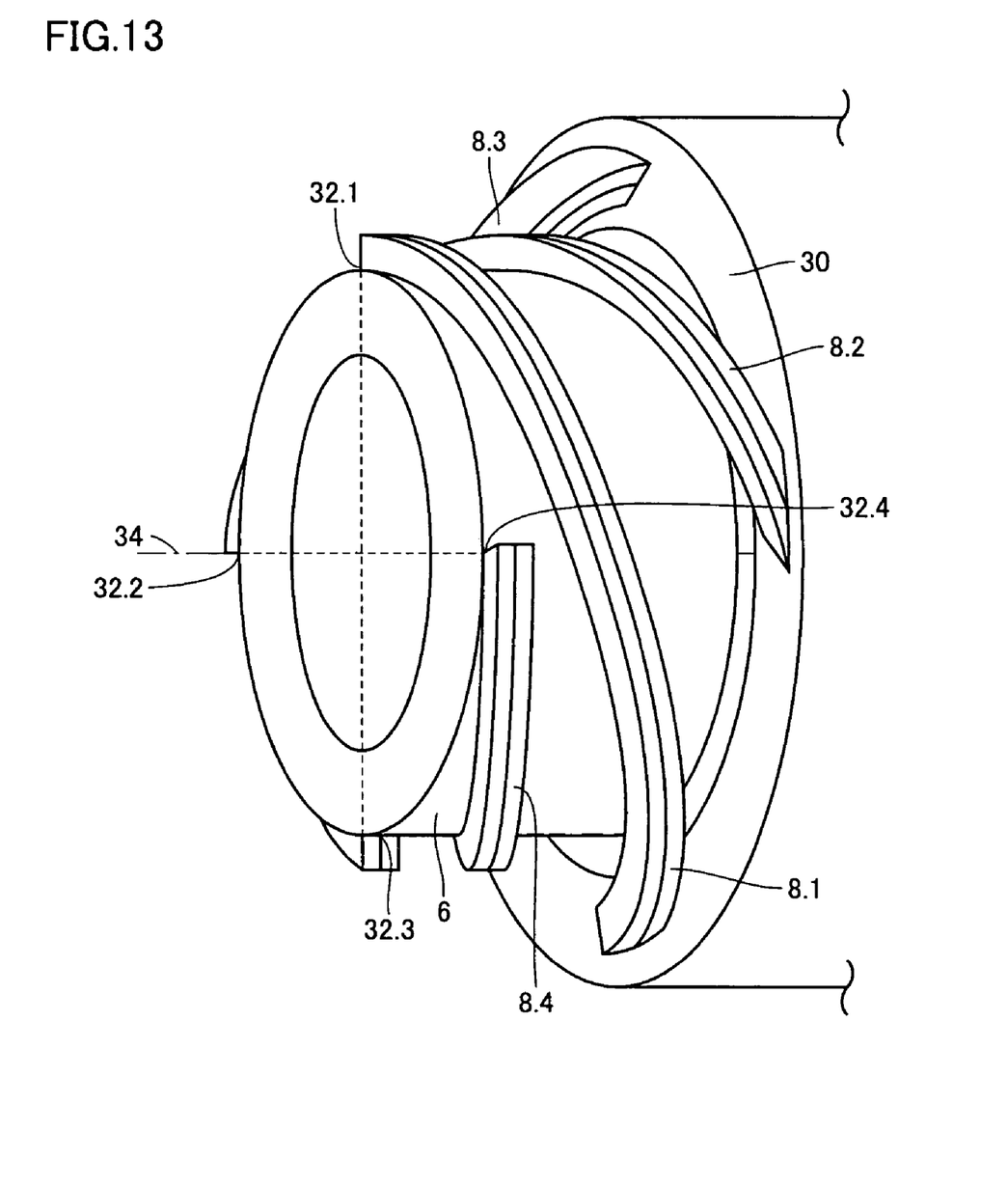
FIG. 13 schematically shows an appearance of the correcting lens unit coupled to four electrostrictive coils in accordance with Embodiment 5.

Referring to FIG. 13, correcting lens unit 6 is coupled to one end of each of electrostrictive coils 8.1, 8.2, 8.3, and 8.4 at coupling points 32.1, 32.2, 32.3, and 32.4, respectively. Coupling points 32.1, 32.2, 32.3, and 32.4 are arranged at an equal distance (at the interval of 90°), with the optical axis 34 being at the center. Further, electrostrictive coils 8.1, 8.2, 8.3, and 8.4 are coupled at the other end to fixed ring 30.

Each of electrostrictive coils 8.1, 8.2, 8.3, and 8.4 is formed to apply displacement in the direction of optical axis 34 to correcting lens unit 6.

Receiving voltages of opposite polarities to each other from voltage applying unit 10, electrostrictive coils 8.1 and 8.3 are capable of causing displacement of correcting lens unit 6 to the left or to the right of the sheet. Further, receiving voltages of opposite polarities to each other from voltage applying unit 10, electrostrictive coils 8.2 and 8.4 are capable of causing displacement of correcting lens unit 6 to the front side or depth side of the sheet.

Specifically, electrostrictive coils 8.1 and 8.3 cause displacement to correct camera shake due to pitching, while electrostrictive coils 8.2 and 8.4 cause displacement to correct camera shake due to yawing. Therefore, camera shake due to pitching and camera shake due to yawing can both be corrected.

According to Embodiment 5 of the present invention, as compared with the image pickup apparatuses in accordance with Embodiments 1 to 4, the correcting lens unit is displaced using a larger number of electrostrictive coils. Therefore, it is possible to drive the correcting lens unit with higher degree of freedom. The shock experienced by the lens unit can be shared by the plurality of electrostrictive coils. As a result, an image pickup apparatus allowing correction with higher degree of freedom and having high shock tolerance can be realized.

The image pickup apparatus in accordance with Embodiments 1 to 5 described above may be applied both to a video camera for picking up motion images and a still camera for picking up still images. Specifically, when used as a video camera, recording means for continuously storing image data output from image processing unit 16 is further provided. When used as a still camera, recording means for storing instantaneous image data output from image processing unit 16 is further provided. Further, the apparatus may also be applied to a conventional film camera, by splitting the image output from lens driving apparatus using a half mirror or the like to form an image also on a photosensitive film.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lens driving apparatus, comprising:
    a lens unit converging an image received from outside;
    a plurality of electrostrictive coils formed of an electrostrictive element that strains in accordance with an electric field generated inside; and
    a voltage applying unit applying a prescribed voltage to said electrostrictive coils in accordance with an external instruction; wherein
    each of said plurality of electrostrictive coils is coupled to said lens unit at mutually different coupling points, and applies displacement caused by strain to said lens unit through said coupling points.

2. The lens driving apparatus according to claim 1, wherein
    said electrostrictive coil is formed by stacking a plurality of piezoelectric elements.

3. The lens driving apparatus according to claim 1, wherein
    said plurality of electrostrictive coils include an electrostrictive coil that strains to cause displacement of said lens unit in a direction of an optical axis of the unit.

4. The lens driving apparatus according to claim 1, wherein
    said plurality of electrostrictive coils include an electrostrictive coil that strains to cause displacement of said lens unit in a radial direction of an optical axis of the unit.

5. An image pickup apparatus including a lens driving apparatus, wherein
    said lens driving apparatus includes
    a lens unit converging an image received from outside,
    a plurality of electrostrictive coils formed of an electrostrictive element that strains in accordance with an electric field generated inside, and
    a voltage applying unit applying a prescribed voltage to said electrostrictive coils in accordance with an external instruction;
    said image pickup apparatus further comprising:
    an image pickup device arranged on an optical axis of said lens unit, and converting the converged image to an electric signal; and
    an image processing unit forming an image data based on the electric signal output from said image pickup device; wherein
    each of said plurality of electrostrictive coils is coupled to said lens unit at mutually different coupling points, and applies displacement caused by strain to said lens unit through said coupling points.

6. The image pickup apparatus according to claim 5, further comprising:
    a swing detecting unit detecting a spatial swing; and
    a control unit giving an instruction to drive said lens unit to said voltage applying unit; wherein
    said control unit gives an instruction to said voltage applying unit based on a result of detection by said swing detecting unit, so that said lens unit offsets the spatial swing.

7. The image pickup apparatus according to claim 6, wherein
    said swing detecting unit detects a spatial swing with reference to the optical axis of said lens unit; and
    said control unit gives an instruction so that said lens unit offsets deviation from the optical axis caused by the spatial swing.

8. The lens driving apparatus according to claim 5, wherein
    said electrostrictive coil is formed by stacking a plurality of piezoelectric elements.

9. The image pickup apparatus according to claim 5, wherein
    said plurality of electrostrictive coils include an electrostrictive coil that strains to cause displacement of said lens unit in a direction of the optical axis of the unit.

10. The image pickup apparatus according to claim 5, wherein
    said plurality of electrostrictive coils include an electrostrictive coil that strains to cause displacement of said lens unit in a radial direction of the optical axis of the unit.

* * * * *